United States Patent [19]
Rabenhorst

[11] 3,964,341
[45] June 22, 1976

[54] MULTI-RING FILAMENT ROTOR

[75] Inventor: David W. Rabenhorst, Clarksville, Md.

[73] Assignee: The Johns Hopkins University, Baltimore, Md.

[22] Filed: Feb. 26, 1975

[21] Appl. No.: 553,113

Related U.S. Application Data

[63] Continuation-in-part of Ser. No. 451,923, March 18, 1974, abandoned.

[52] U.S. Cl. ................................ 74/572; 74/573 R
[51] Int. Cl.² .......................................... F16C 15/00
[58] Field of Search ....................................... 74/572

[56] References Cited
UNITED STATES PATENTS

1,365,473  1/1921  Emmet ................................ 74/572
1,426,339  8/1922  Sperry ................................ 74/572

*Primary Examiner*—Allan D. Herrmann
*Assistant Examiner*—F. D. Shoemaker
*Attorney, Agent, or Firm*—Kenneth E. Darnell; Robert E. Archibald

[57] ABSTRACT

A rotary energy storage device or flywheel structure is provided with a rim portion comprised of multiple rings or windings of filamentary material having high tensile strength and which are bonded or otherwise held together at a predetermined number of localized areas, such as at opposite ends of one or more radial spokes so that major portions of the individual rings or windings may expand with minimum constraints during rotation of the flywheel structure.

26 Claims, 26 Drawing Figures

MULTI-RING FILAMENT ROTOR

STATEMENT OF GOVERNMENTAL INTEREST

The invention herein described was made in the course of or under a contract or subcontract thereunder, with the Department of the Navy.

CROSS-REFERENCE TO RELATED APPLICATION

This application is a continuation-in-part of U.S. patent application Ser. No. 451,923, filed March 18, 1974, by the same inventor, the aforesaid application being hereby abandoned.

BACKGROUND OF THE INVENTION

During the past several years a new flywheel technology has evolved, which has resulted in a several-fold improvement in the energy density of the flywheel structure, while at the same time offering major advances in safety and economy of the device. These improvements are for the most part brought about by the employment of anisotropic, filamentary materials such as carbon or fiberglass fibers or a new DuPont fiber known as Kevlar, all having strength-to-density properties significantly greater than the best practical steel. In addition, the filamentary composition of such materials is of significant importance in flywheel application, since it is this property which enables the flywheel to be more readily designed for failure containment than solid steel flywheel structures previously proposed.

More particularly, it has previously been proposed that improved flywheels can be constructed in the form of wound disc structures with either fiberglass or steel foil as the principal structural material, and such structures are described in detail in a Russian book entitled, "Inertial Energy Accumulators", by N. V. Gulia, Voronezh University Press, Voronezh, 1973. Unfortunately, such structures have had only limited success, because of the hub attachment difficulty usually found with this type of structure. In an effort to overcome the hub attachment problem associated with wound disc flywheel structures, I previously proposed a circular brush flywheel configuration which utilizes radially oriented fibers or rods, such as are disclosed in my U.S. Pat. Nos. 3,698,262 and 3,737,694. On the other hand, for certain flywheel applications, it would be advantageous to have an alternative flywheel configuration which, at least in theory, appears capable of storing more energy per unit volume than the circular brush configuration, and at a reduced rotational speed or rpm for a given energy level.

The principal reason that previous attempts to build filament-wound flywheels have met with only limited success is the fact that the stress on the wound filaments varies as the square of the distance of the filaments from the center of rotation. Since the amount that the filament stretches is proportional to the stress, the filament thus also stretches in proportion to the square of its radius of rotation; i.e., in a wound rotor having an inside radius of one-third its outside radius, the outside filaments would stretch nine times as much as the filaments on the inside. In this situation, as has been demonstrated many times in past experiments, the flywheel breaks into many concentric rings long before the filaments have reached their breaking stress. This, of course, is true if there are no extra radial filaments in the flywheel structure to take the radial loads. On the other hand, if such extra filaments are added, then the weight of these filaments must be added when determining the energy density of the structure. This simple paradox accounts for the lack of success of the filament-wound and multi-rim flywheels previously attempted; performance typically being about 20–30% of theoretical.

One previously proposed manner of accommodating the differential stretching of the filamentary materials is to provide an elastomer matrix which acts as a spacer between the rings or filaments of a multi-ring flywheel. However, it is not clear that the elastomer can withstand the high acceleration forces occurring during flywheel operation, and at the same time provide the required stretch capabilities in some direction while also providing the required stiffness in other directions. Moreover, the elastomer matrix will occupy about 30% as much space as the working filaments and thereby degrade the volume, weight and intrinsic cost of this type by about ⅓ compared to the theoretical optimum multi-ring flywheel configuration.

SUMMARY OF THE INVENTION

In order to overcome the deficiencies of the prior art and realize more fully the advantages of the multi-ring flywheel configuration, it is proposed in accordance with the present invention that the multiple rings, filament windings, tape windings, or composite rod windings constituting the rim portion of the flywheel be bonded or otherwise held together at a minimum number of localized areas, such as at the ends of one or more single radial spoke members. Moreover, in accordance with the present invention, there is no matrix material between unbound portions of the rings or winding elements, the individual rings or windings being thereby allowed to expand more freely. A more effective ring volume, weight and cost is thereby achieved. As will be described in more detail hereinafter, it is also proposed in accordance with the present invention, to provide novel structure for connecting the rim so formed to the hub/spoke portions of the proposed flywheel structure in such a manner as to minimize undesired unbalancing forces on the rim.

Moreover, in accordance with the present invention, the proposed multi-ring flywheel structure allows optimal use of certain bare filament members, (such as wire, nylon, or Kevlar) which is particularly important in applications employing relatively small size flywheels wherein the filament-wound structure can satisfactorily hold its wound shape under gravity forces without damage when not operating. As regards the use of bare filaments to comprise the rings of the proposed multi-ring flywheel structure, it is also contemplated that, in order to reduce the size and cost of the overall structure, an inexpensive ballast material can be utilized particularly in the inner rings of the ring structure, as will be explained hereinafter, since the stress in the individual ring is a function of the square of that ring's radius, and therefore all rings except the outermost are operating below their maximum stress capability, hence below their maximum energy capability.

In view of the foregoing, one object of the present invention is to provide an improved multi-ring flywheel structure wherein the rim portion is formed of multiple rings or filament windings bonded or held together at a minimum number of points.

A further object of the present invention is to provide a multi-ring flywheel structure wherein no matrix material is employed between major portions of the rings or windings constituting the rim portion of the structure.

A further object of the present invention is to provide a rotary energy storage device or flywheel which utilizes anisotropic filamentary materials and which possesses greater energy per unit volume and per unit weight than previously proposed flywheels.

A further object of the present invention is to provide an improved structure for interconnecting the rim and hub/spoke portions of a flywheel structure, whereby the rim is permitted some degree of freedom when changing state between standstill and high speed rotation.

A further object of the present invention is to provide a rotary energy storage device or flywheel having increased energy per unit volume and weight, at reduced cost and increased safety.

Other objects, purposes and characteristic features of the present invention will in part be pointed out as the description of the present invention progresses and in part be obvious from the accompanying drawings, wherein:

It is proposed in accordance with the present invention to provide an improved multi-ring flywheel structure wherein the rim portion is comprised of multiple rings or filament windings of high tensile strength, anisotropic materials, such as carbon or fiberglass fibers, having strength to density ratios many times greater than the best practical steels previously proposed for use in flywheel applications. As noted earlier, a further fiber material from which the multiple rings or filamentary windings can be formed for the rim portion of the proposed flywheel of the present invention is a new fiber marketed by DuPont under the trade name Kevlar which has a tensile strength, for the unidirectional composite, of 250,000 psi and a density of 0.05 lb per cubic inch; the tensile strength of the bare elements having been measured at over 500,000 psi. This fiber is currently being used as a structural material in a wide variety of components in most of the major aircraft manufactured in the United States today. It does not suffer appreciably from the static fatigue problems usually associated with fiberglass; it is often used at a very high percentage of its tensile strength; and, its strength-to-density and modulus of elasticity are both considerably higher than glass.

Figure 1A:
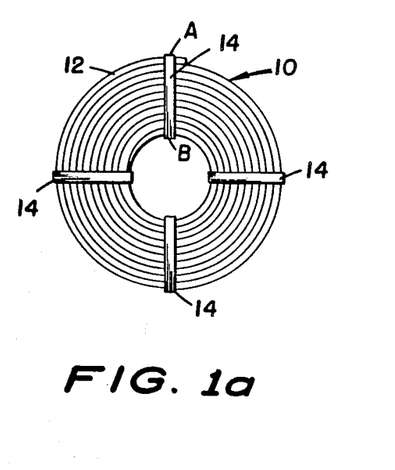
FIGS. 1a and 1b are diagrams illustrating the basic concepts underlying the invention.
Figure 1B:
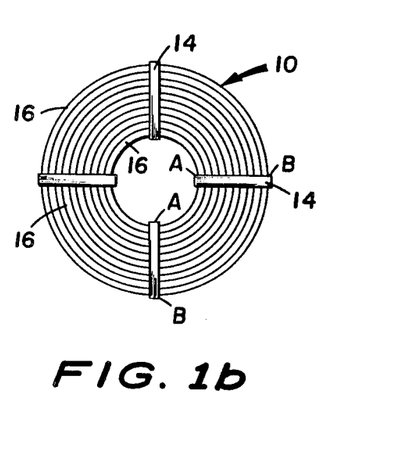

Referring now to FIGS. 1a and 1b of the drawings, the proposed flywheel concept basically comprises a rotor structure having a rim member 10 formed according to the following generalized conditions, particular embodiments of these concepts being shown in detail hereinafter. In FIG. 1a, the rim member 10 is formed of windings 12 of a filamentary material. The filamentary material may be bare filaments either wound about a shaft or about a mandrel with the wound rim then being attached to a shaft in any of a variety of ways. Alternatively, the "wound" filamentary material can be "tape windings", i.e., filamentary elements formed into a flat tape, or composite rod windings as a further example. The important aspect to note here is that the windings 12 are to be held within the rim member 10 by some restraining means such as bands 14. The bands 14 encircle the localized radial periphery of the rim member 10 and hold those portions of the windings 12 thereby encircled in a *fixed* position relative to each other along at least one radius occupied by one of the bands 14. In practice, two of the bands 14, extending along a full diameter of the structure, hold the windings 12 along that diameter. A plurality of the bands, four as shown in FIG. 1a, may be employed with the same function. Means not shown in FIG. 1a or FIG. 1b but described hereinafter are also employed to effectively hold those portions of the rim member 10 held by the bands 14 in an effectively fixed position relative to the center of rotation of the structure itself. The bands 14 can also be formed of filamentary material wound about the rim member 10 and may be used in combination with a matrix material flowed only between those portions of the rim member 10 which underlie the bands 14. It is even possible to use a matrix material or potting material in place of the bands 14 in order to restrain relative motion of the windings 12 along one or more diameters of a structure.

The rim member 10 of FIG. 1a (and of FIG. 1b) can be fitted onto a shaft having an outside diameter essentially equal to the inner diameter of the rim member 10. In such a situation, the windings 12 would contact the shaft itself, and those portions of the rim member 10 restrained by the bands 14 (or other structure) would be fixed relative to the shaft. The unrestrained portions of the rim member 10 are free to expand relative to each other and relative to any shaft or hub means as will be described in more detail hereinafter. The rim member 10 may be fitted onto a shaft by hub means of various description whereby the outer diameter of the shaft is smaller than the inner diameter of the rim member 10. Regardless of whether the rim member 10 is contiguous to the shaft or not, the same principles of operation apply.

FIG. 1b can now be briefly described as being exactly analogous to FIG. 1a except that the rim member 10 is formed of discrete annular rings 16 of anisotropic filamentary material, the rings 16 being of progressively greater diameter with distance from the center of the structure. In both the structures of FIG. 1a and FIG. 1b, the rim members 10 are constrained on, in, across, or therearound in order to prevent differential radial expansion between points A and B on the rim members. However, the major portions of the rim members 10 (which are not restrained by the bands 14 or other means) are allowed to stretch radially. Thus, no matrix is required within the unrestrained portions of the rim members 10 to hold said members together. It is to be particularly noted that varying ring (or winding) densities or moduli are not required in these structures. In other words, the same material can be used throughout the rim members 10 for the windings 12 or for the discrete rings 16.

Figure 2:
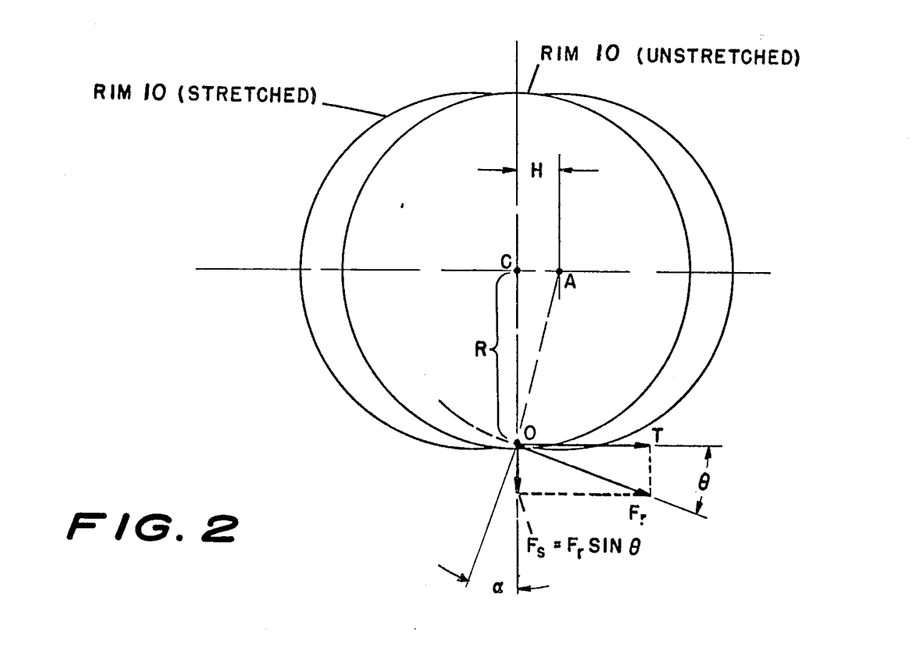
FIG. 2 is a simplified diagram illustrating, in exaggerated form, an individual rim ring of the proposed flywheel structure in its initial (at rest) and stretched (rotating) positions, the diagram being useful in describing the operation of the proposed structure.

Referring now to FIG. 2, a simplified representation of the principal rim expansion criteria is geometrically presented. As specifically shown, it is desirable if, during rotation (and thus stretching), that the rim member 10 be normal to a restrained diameter (restrained such as by the bands 14 of FIGS. 1a and 1b). The rim-induced load along the restrained diameter would always be zero, as would the additional bending stress on the rim member 10 at the outermost point of the diameter. A spoke or other member connecting the rim member 10 to a shaft is thus conveniently placed along such a diameter. In practice, the rim member 10 will assume a shape such as that noted for the stretched mode of FIG. 2, assuming the rim member 10 to be spinning about axis of rotation C. The rim member 10 is assumed to be thin and infinitely flexible for purposes of analysis, since the tangential load is (by definition) nominally the same at all peripheral locations and since the radial load on the rim member 10 is also equal at all peripheral locations, it follows that the stretched rim must be close to a circular arc of some new radius. For this discussion it is assumed that the radius of the stretched arc is the same as in the unstretched case, but that its center is displaced by a distance H from the original center of the rim (at C). It can now be seen by means of simple geometry that when a line is drawn connecting the new center A with the intersection O of the diameter and the rim, the angle formed ($\alpha$) is equal to the angle ($\theta$) representing a reasonable approximation of the maximum angle that a stretched rim would make when attached to a fixed diameter length. Actually, this angle $\theta$ would be reduced in proportion to the amount of stretch of the spoke. In FIG. 2 line OT represents a line parallel to the original rim tangent, $OF_r$ is the tangent at the stretched position, and $OF_s$ then indicates the relative magnitude of the load imposed on a spoke occupying the restrained diameter (such as in FIG. 4) by the stretched ring. Its actual magnitude, according to the stated assumptions, is given by:

$$F_s = F_r \sin \theta$$

where:
$F_s$ is the stress on the diametrical spoke imposed by the stretched rim
$F_r$ is the stress on the rim at the stretched condition
$\theta$ is the approximate angle from the normal to the diametrical spoke made by the stretched rim.

The amount that the rim will stretch under a particular stress level is, of course, the strain value of the particular material at the stress level being used. Since this strain is usually defined as a percentage of a given length, it follows that the distance H is that same percentage of the rim's original radius (CO = R). Again, from simple trigonometry, the angle $\theta$ equals arc sin H/R.

Figure 3:
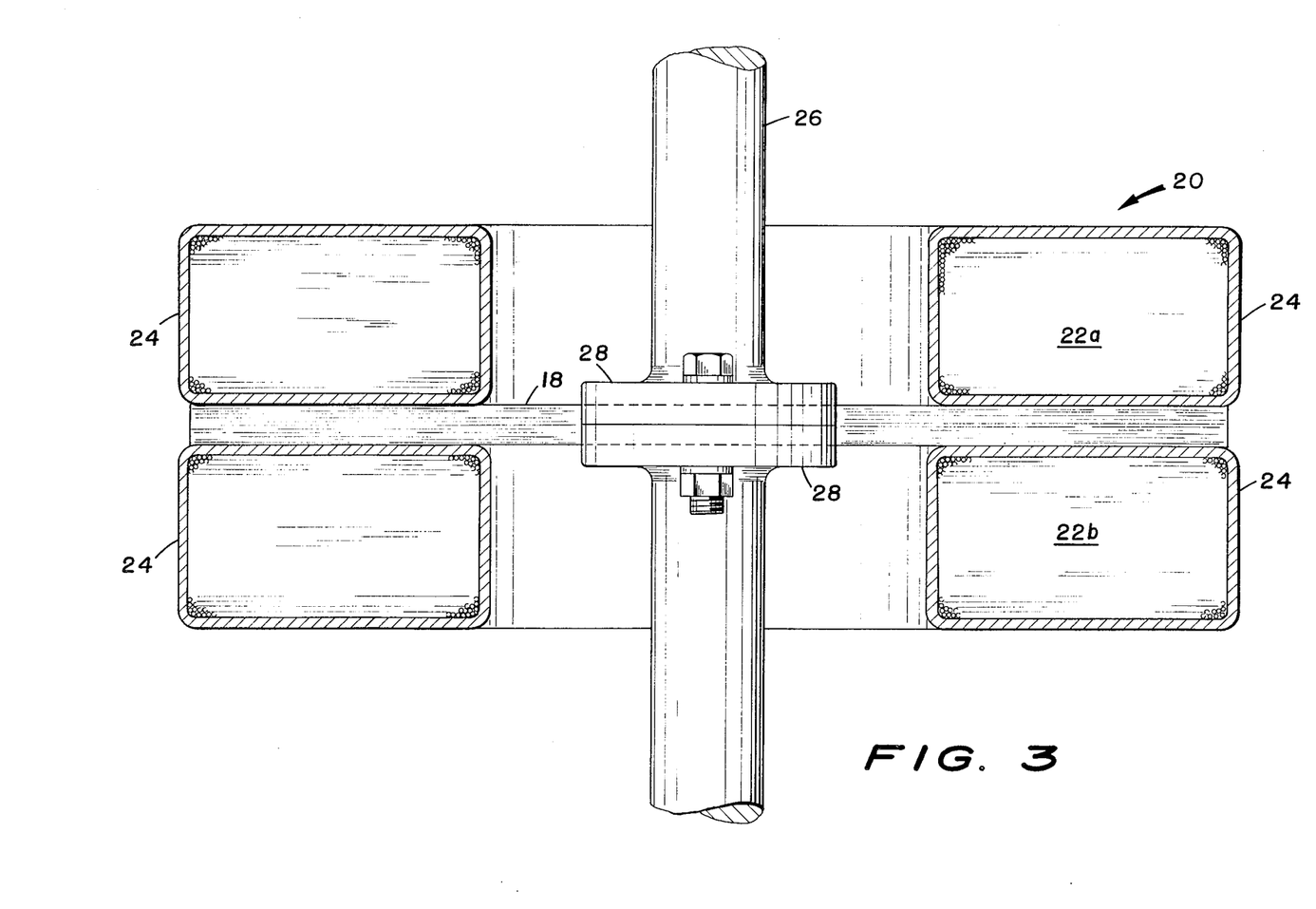
FIG. 3 is an elevation of an embodiment having a spoke member connecting a split rim member to a shaft.

FIG. 3 primarily illustrates an embodiment of the invention wherein a spoke member 18 is utilized to attach a rim member essentially configured according to the teachings of FIGS. 1a and 1b to a rotating shaft. The rim member 20 of FIG. 3 is comprised of two annular half members 22a and 22b which are formed either of filamentary windings such as the windings 12 of FIG. 1a or discrete rings such as those rings 16 of FIG. 1b. Each half member 22a and 22b is bound along non-contiguous portions thereof which lie on a given diameter by bands 24 which can simply be wound filamentary material which essentially encircles the windings or rings forming the members 22a and 22b. The spoke member 18 also lies along the diameter along which the bands 24 lie, the spoke member separating the members 22a and 22b and being attached fixedly to said members 22a and 22b. The spoke member 18 may be formed of anisotropic filamentary elements of fibers which may be within the spoke member in a direction parallel to the diameter of the structure itself along which said spoke member lies. The spoke member 18 attaches to shaft 26 by being clamped between hub plates 28 which can be integral with the shaft 26 and which can be bolted together as shown. The spoke member 18 thus holds the rim member 20 in a fixed position relative to the shaft 26 along the diameter of said member 20 occupied by the spoke member 18. More than one spoke member 18 could be so employed. As shown in FIG. 3 the rim member 20 itself supports most of the centrifugal load caused by its own rotating mass while it stretches out under load. Only a small proportion of this load is supported by the spoke 18. It should be stressed here that no matrix material is necessary or desirable between unrestrained portions of the individual rings or windings comprising the members 22a and 22b. As a result, major portions of the individual rings and windings are allowed to expand freely during rotation of the device as described in FIG. 2, such that the outer rings or windings will always be clear of the inner ones, since they will stretch in accordance with the square of their respective distances from the center, as explained heretofore.

Referring again to those principles described relative to FIG. 2 in light of the structure of FIG. 3, the interaction of the spoke member 18 and the rim member 20 can be further appreciated when related to particular materials. For example, the strain for Kevlar epoxy at 250,000 psi is about 1.9%. Under this condition, the angle $\theta$ of FIG. 2 would be one degree, five minutes, and the imposed stress on a spoke member such as 18 of FIG. 3 would be 4750 psi (same geometry assumed for cross section). A rim material possessing a higher modulus of elasticity would have a correspondingly lower imposed stress on the spoke since the rim would stretch less, and the angle $\theta$ would decrease. On the other hand, the fact that the spoke also stretches has a relieving effect on its stress imposed by the stretching rim. If the spoke were made of the same material and cross section as the rim, the stretch of the spoke would reduce the rim-imposed stress by about 17%. Naturally, if the spoke were designed to stretch the same amount as the rim in the radial direction, then the imposed stress caused by rim stretch would be zero.

There are two rather simple ways that this can be effectively accomplished. First, since the rim/spoke stress ratio at a given rpm is about three, the spoke can be made of a material having about one-third the modulus of elasticity of the rim filaments. At this condition, the mass of the spoke would cause it to stretch the same amount as the rim. This can also be effectively accomplished by giving the spoke a shape which is radially flexible. The second method of reducing rim-imposed load on the spoke would be to stretch the ring during assembly to a larger spoke radius, such that when it stretches during rotation, from centrifugal load, it becomes a circle, whereupon angle $\theta$ and the imposed stress are both zero. This represents, perhaps, the optimized case and is described hereinafter.

Referring to the rim member 20 of FIG. 3, it has been said that individual discrete rings or individual filament windings can be utilized. The would configurations can employ bare filaments, composite wires, composite tapes, or composite rods. These configurations could be made from materials such as fiberglass or carbon fibers in a polymer matrix; metals, fibers or whiskers in a polymer or metal matrix; or wood, bamboo, etc. Typical of these configurations is a fiberglass epoxy manufactured by the Condex Corporation which has an apparent composite ultimate tensile strength in excess of 450,000 psi. This material is usually supplied as a composite wire having a cross-sectional diameter of 0.042 in. Reliable termination of this wire with a mechanical fitting is extremely difficult to accomplish at stress levels approaching the ultimate tensile strength of the wire (which, of course, is desirable for optimum performance of a multiring flywheel made of this material). Large rotors could also require larger wire sizes, which would make wire termination even more difficult. The following method of fabrication alleviates this problem considerably, and in many flywheel configurations, eliminates the termination problem completely.

Figure 4:
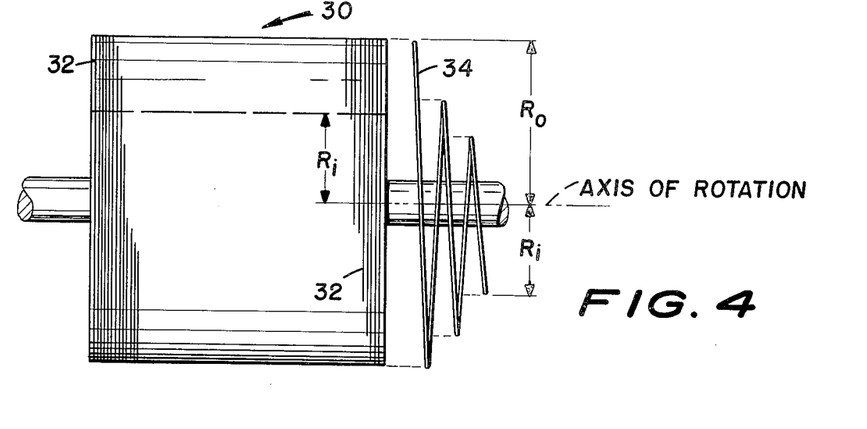
FIG. 4 is a diagram illustrating a method for winding certain embodiments of the invention.

Referring then to FIG. 4, a rim member 30 made from the fiberglass epoxy wire windings 32 would normally be made by winding the disc to the desired size and shape (axial length) beginning at the inner winding and proceeding outward. Now, terminating the inner end is no problem, since the maximum stress expected here will never be more than about ¼ of the stress at the outer winding at a particular RPM for the example given. However, when the conventional winding process is completed, the winding 32 would usually be terminated at the outer edge of the rim member 30. According to the present method, however, the rotor winding 32 begins at the inner periphery ($R_i$) of the member 30 and ends on the outer periphery ($R_o$). At this point $R_o$ the winding is continued for a single coil 34 *inward* to terminate on the inner periphery ($R_i$), where the stress is $(R_i/R_o)^2$ times the stress at $R_o$ for a given rotational speed.

Of course, the concept would work equally well if the final inward winding 34 consisted of many coils, or even 50% of the main winding 32, but inward winding is considerably more difficult to achieve with automatic machinery, making a single inward would coil the preferred arrangement. The rim member 30 may be held by bands (not shown here for simplicity of description), such as the bands 14 described relative to FIGS. 1a and 1b, or may be held by a matrix material in order to restrain relative motion of the windings 32 along one or more diameters of the structure as has been also described previously.

FIGS. 5 through 18 diagrammatically illustrate several alternative manners of constructing the proposed multi-ring flywheel unit.

Figure 5:
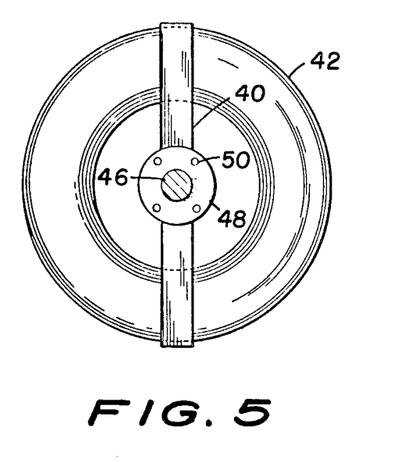
FIG. 5 is a top planar view of a further embodiment of the present invention wherein unidirectional composite material is wound diametrically across the flywheel structure, to form the spoke member which holds the multiple rim members at diametrically opposed locations and also secures them to the hub or shaft portion of the flywheel structure.

In FIG. 5, a layer or band 40 of unidirectional composite filament material, for example, of the types described above, is would diametrically across flywheel rim member 42 composed of a winding to form a structure analogous to the spoke member 18 of FIG. 3. In those areas where the band 40 intersects the rim member 42, all of the would filamentary materials in the rim member are bonded together and to the ends of the spoke band 40. A suitable spacer member 44 is provided in the embodiment shown in FIGS. 5 and 6 to which a shaft 46 is affixed by flanges 48 and bolts 50; the flanges 48 having a diametrical groove 52 through which the band 40 passes.

Figure 6:
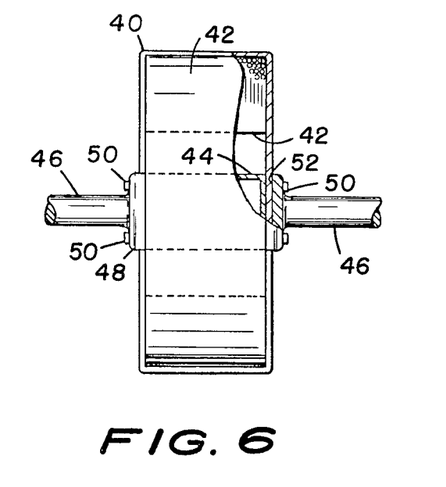
FIG. 6 is a side view, partially in section, of the embodiment of FIG. 5.
Figure 7:
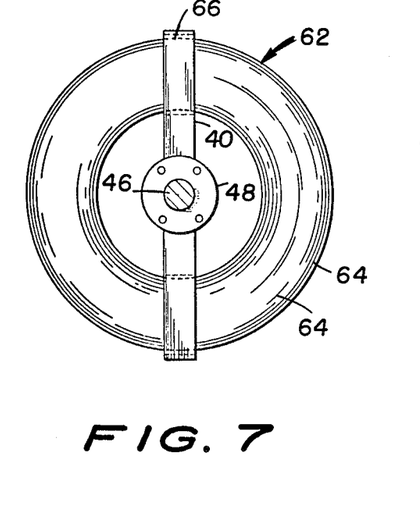
FIG. 7 is a further embodiment of the proposed multi-ring flywheel structure similar to the embodiment shown in FIGS. 5 and 6, except that the area where the spoke and rim are attached is prewrapped with unidirectional composite material before the spoke member is attached.
Figure 8:
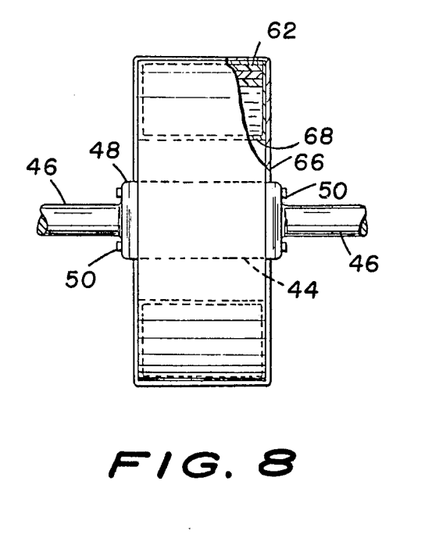
FIG. 8 is a side view, partially in section, of the embodiment of FIG. 7.

The multi-ring flywheel structure illustrated in FIGS. 7 and 8 of the drawings is quite similar to that just described and shown in FIGS. 5 and 6, except that in this embodiment, rim member 62 is shown as being comprised of many individually wrapped, discrete rings 64 formed of anisotropic materials as described above. Moreover, the localized area of the rim member 62 at which the individual rings 64 comprising the rim member are bonded together and attached to a spoke member 66 are prewrapped with a suitable unidirectional composite 68 before the spoke member 66 is wrapped therearound and attached. The composite 66 could also extend between layers of the rings 64 (or windings as in FIG. 5) as desired.

Figure 9:
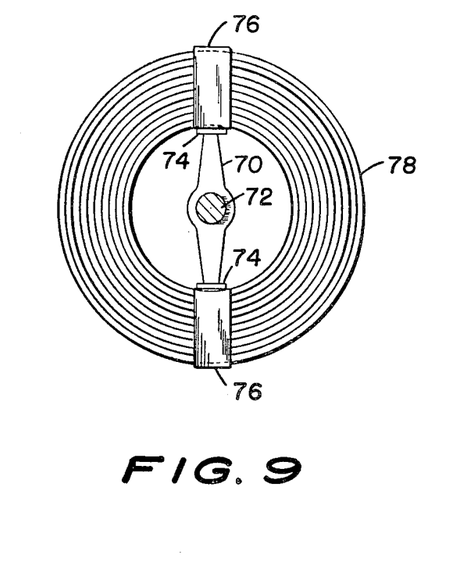
FIG. 9 is a top planar view of a still further spoke/rim attachment possibility.
Figure 10:
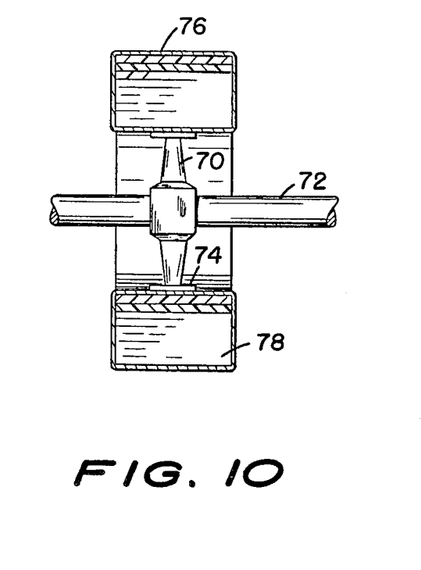
FIG. 10 is a side view, partially in section, of the embodiment of FIG. 9.

FIGS. 9 and 10 show a more or less conventional spoke member 70, with a central hole to receive a through-shaft 72 and having enlarged attachment fittings 74 at either end for connection, e.g., by bonding, to containment bands 76 which encircle and hold the multi-rings or filament windings or fim member 78 in the localized regions as described hereinabove. The spoke/rim and the spoke/shaft attachments here can be either swivel or rigid joints. The swivel joints would allow a modest amount of gimballing of the flywheel, although it is likely that this would induce vibration, the amplitude of which will be proportional to the amount of gimbal angle.

Figure 11:
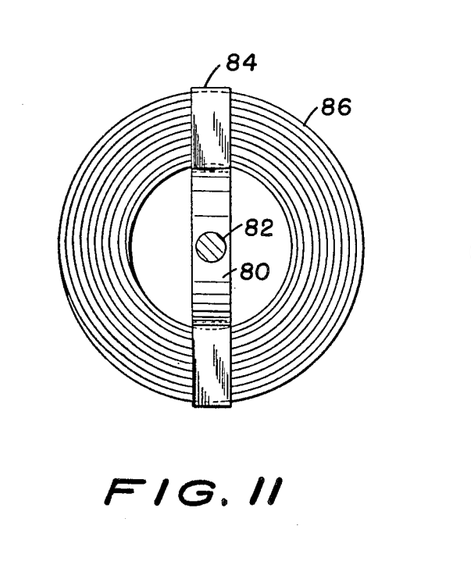
FIG. 11 illustrates a further structure for interconnecting the shaft and multi-rim portion of the proposed flywheel by means of a single flexible hoop.
Figure 12:
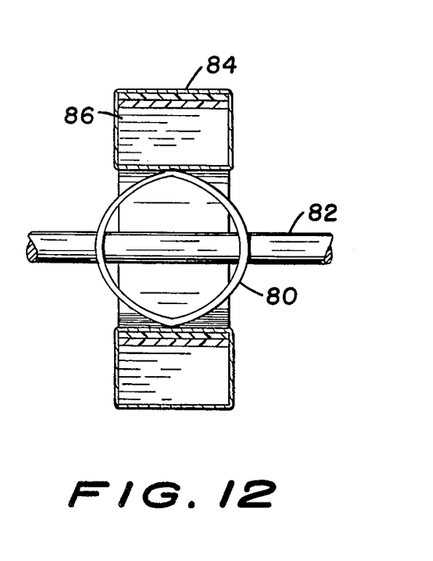
FIG. 12 is a side view, partially in section, of the embodiment of FIG. 11.

The configuration shown in FIGS. 11 and 12 is substantially the same as that illustrated in FIGS. 9 and 10 except that the spoke member is now in the form of a thin, flexible hoop 80 instead of a rigid member. The hoop 80 can be constructed of any suitable material, such as metal, or can be made of the same composite filament materials from which rim member 86 is fabricated. In either case, the preferred shape of the hoop 80 would be that which would undergo negligible shape change between the non-spinning and the spinning conditions of the flywheel, and each half of the hoop would be in the shape of a catenary (nearly parabolic), as shown in FIG. 11. The hoop 80 could be connected to shaft 82 and to the containment rings or bands 84 in any number of conventional manners.

Figure 13:
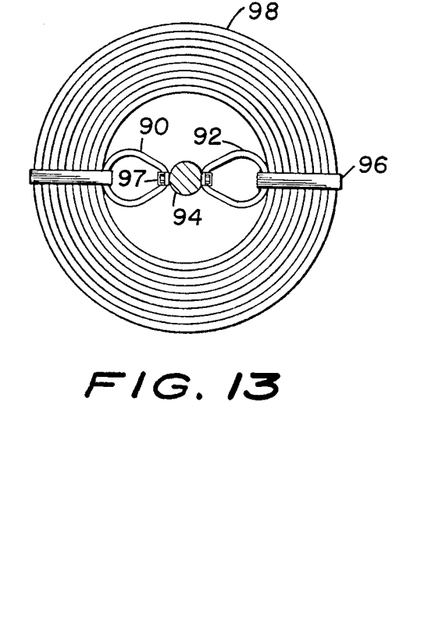
FIG. 13 is a modified version of the embodiment of FIGS. 11 and 12 where the single hoop of FIGS. 11 and 12 is replaced by a pair of flexible hoops mounted in diametrically opposed relationship between the shaft and rim portion of the flywheel structure.
Figure 14:
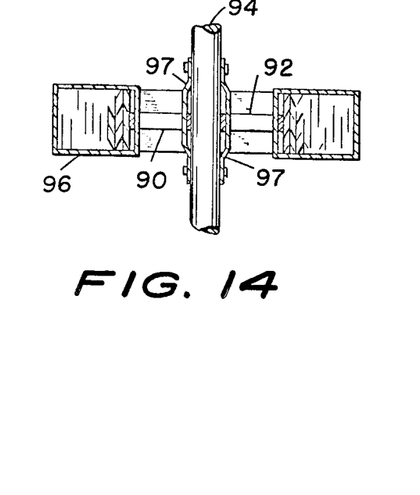
FIG. 14 is a side view, partially in section, of the embodiment of FIG. 13.

A somewhat modified structure is illustrated in FIGS. 13 and 14, where the single loop is replaced by two, diametrically aligned loops 90 and 92 disposed between opposite sides of shaft 94 and containment bands 96. By way of example, the hoops 90 and 92 might be connected quite simply between rim member 98 and the shaft 94 by having the band 96 encompass the outer end of the hoop while the diametrically opposed inner end of the hoop is affixed by bonding (welding) or by means of a suitable attachment strip secured longitudinally to the shaft 94, as shown.

The advantage of utilizing the single flexible hoop, as in FIGS. 11 and 12 or the pair of hoops, as in FIGS. 13 and 14, to constitute the spoke member for interconnecting the shaft and the rim portions of the flywheel structure is that the requirement for balancing of the structure is thereby minimized, since this type of connection can be made sufficiently flexible in the radial direction to permit the rim portion to spin about its center of mass instead of the geometric center at design rpm.

Figure 15:
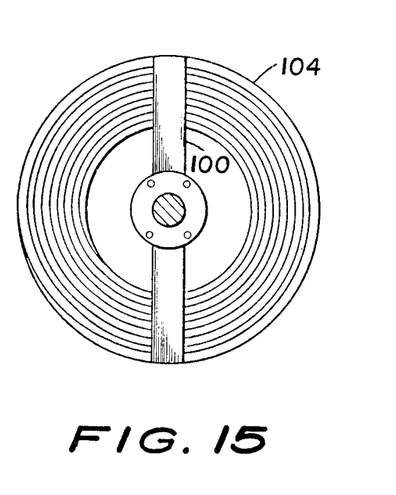
FIG. 15 is a top planar view of another embodiment of the present invention wherein the multi-rim portion of the flywheel is formed of stacked annular layers or discs, each comprised of multiple rings or filament windings, with adjacent layers of the rim being separated from one another by spoke laminae.
Figure 16:
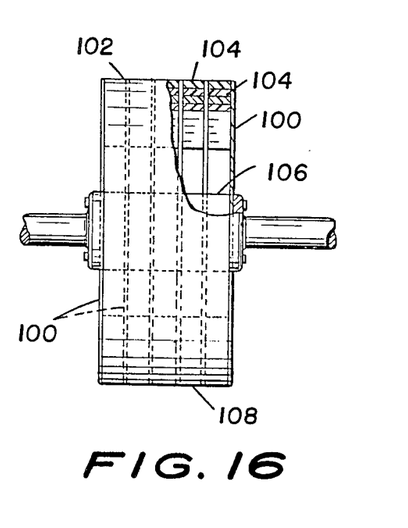
FIG. 16 is a side view, partially in section, of the embodiment of FIG. 15.

A still further manner of interconnecting the various component parts of the proposed multi-rim flywheel structure is illustrated in FIGS. 15 and 16. Here, the spoke member is comprised of a plurality of strips 100 of simple unidirectional or bi-directional composite material or suitable metal or other material which are aligned perpendicular to the axis of rotation and whose opposite ends are interspersed between annular layers 102 of discrete rings or filamentary windings forming collectively the flywheel rim member 104. The shaft and spacer arrangement can be essentially the same as that described previously relative to FIGS. 5 and 6, with individual spoke strips or laminae 100 extending through spacer 106, as shown. The spacer may be either one piece or several stacked pieces, and would be slotted to accommodate the spoke strips 100.

A number of inherent advantages are offered by the embodiment shown in FIGS. 15 and 16. The construction is relatively simple and the amount of filament winding required for the rim member 104 is minimized. Also of significance is the fact that the rings within the layers 108 of rim member 104 are supported more evenly, making this a preferred configuration for applications necessitating very long axis flywheels.

Figure 17:
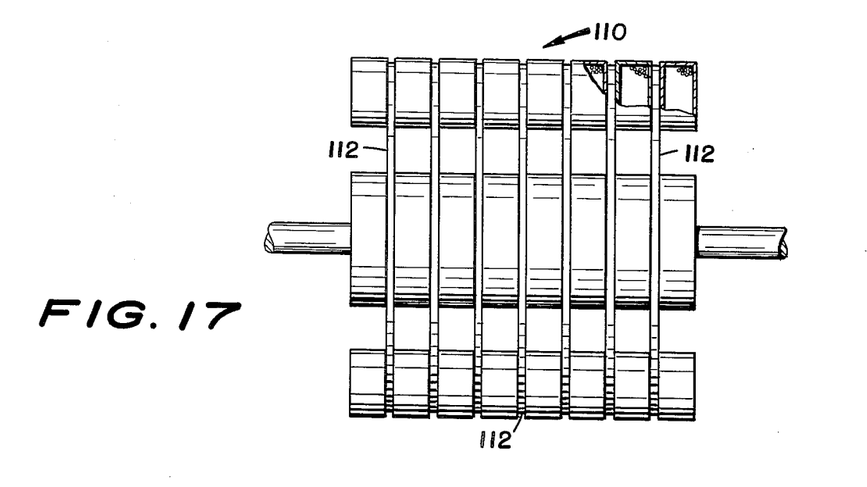
FIG. 17 is a diagram of a multi-spoke embodiment of the invention.

A variation of the embodiment shown in FIGS. 15 and 16 is illustrated in FIG. 17. In this embodiment, a large number of thin rim members 110, each comprised of multiple annular layers 108 as heretofore described, is supported by an equal number of spoke members 112. But instead of having a single contiguous structure, as in FIG. 15, the structure shown in FIG. 17 is comprised of a large number of axially thin rim members 110, each supported by a spoke member 112. And, in this embodiment, the spoke member 112 can be made axially, and/or torsionally, and/or radially flexible to allow gimballing of the rim members 110 through small angles (less than 10° or 15°). This flexible, thin layered, arrangement permits minor gimballing of the structure with a minimum requirement for additional flywheel container size and without excessive vibration.

Figure 18:
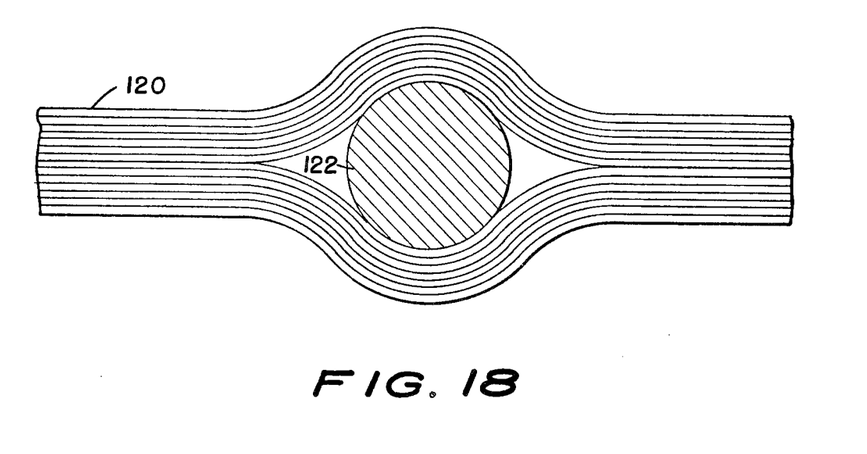
FIG. 18 is a diagrammatic showing of one manner of attaching a through-shaft to the spoke member in the proposed flywheel structure.
Figure 19:
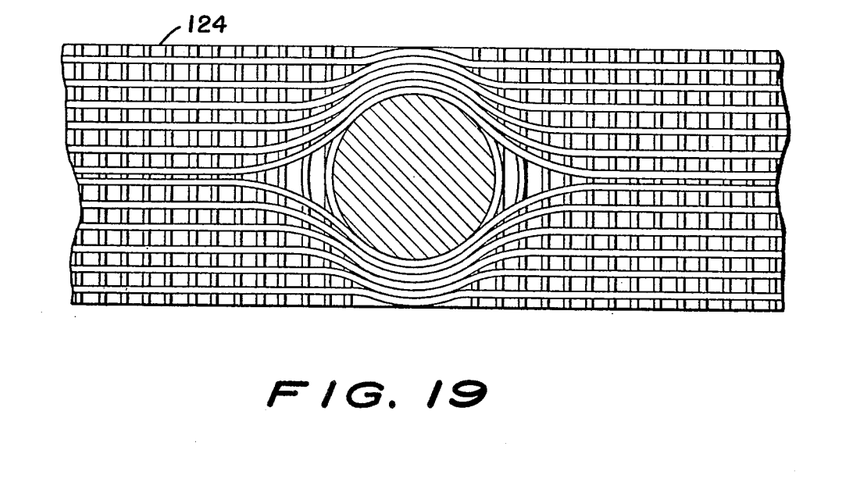
FIG. 19 shows an alternate technique for attaching a through-shaft to the spoke member, where the spoke member is formed of bi-directional filaments.

In FIGS. 18 and 19, alternate means for attaching a spoke member to a through-shaft are illustrated. In FIG. 18, spoke member 120 is shown as being a unidirectional composite filament material wrapped around shaft 122; whereas, in FIG. 19, spoke member 124 is formed of a bi-directional composite filament material. Metal could also be used. Either of these spoke/-through shaft arrangements may be employed, if desired, as an alternative to having the spokes extend through the flywheel shaft or to employing a sectionalized shaft.

As mentioned previously, a further significant advantage of the proposed multi-rim flywheel is that it allows optimal use of bare filaments, especially in the relatively small flywheel size, i.e., small enough that the filament wound structure can satisfactorily withstand gravity forces without damage when not operating. This could, in some cases, result in 100% or more improvement in the energies per unit weight and volume of the device. For example, the Kevlar material noted earlier is approximately 65% fiber and the balance is epoxy matrix. Its usable strength, at 250,000 psi, is about half of what it would be if the matrix were not there, and only the bare filaments were used. It is typical of most filamentary materials that the strength of the composite (for a number of reasons) is about half of the strength of the filaments by themselves, even though the percentage of filament in the composite may be greater than 50%. But, in the proposed multi-rim flywheel structure there not only is no requirement for any matrix between the respective rings of the flywheel rim, there is also no requirement for any matrix between the filaments. Naturally, a doubling of the usable strength-to-density doubles the energy density, cuts the cost in half, and reduces the size by a factor of two provided that the filaments are capable of satisfactory use in the long lengths required. Filaments which have this capability include Nylon, Dacron, Kevlar, metal, wire, etc. Filaments which do not normally have this capability include fiberglass, carbon/graphite, asbestos, various whisker materials, etc.

The present rotor structures can be wound like a spool of thread using constant modulus and constant density with no elastic material being required between the windings. In fact, these structures can be wound without the use of spoke members or hub structures. As alluded to hereinabove, filamentary material can be wound directly onto a shaft outwardly to a desired $R_o$. The energy/weight for such a configuration would only be 50% of optimum; that is, 50% of that of an infinitely thin ring; but, it would be about 75% of that of a multi-ring flywheel having a practical $R_i/R_o$ ratio (i.e., 58%). Thus, if the ring material were steel hose wire wound directly on the shaft, it could have an energy/weight performance of about seven watt hours per pound; whereas, if it had an $R_i = 58\%$ of $R_o$, and spokes and hub, it could have an energy/weight performance of about nine watt hours per pound. At $.45 per pound, the ring material in the shaft-wound rotor would cost $64. for a 1 kwh unit; whereas it would only be $50. for the spoke/hub unit. Clearly then, if the cost of the spokes and hub were more than the difference between these two ($14.), then it would be more economical to use the shaft-wound rotor over the spoke/hub rotor, even at the lower performance.

Figure 20A:
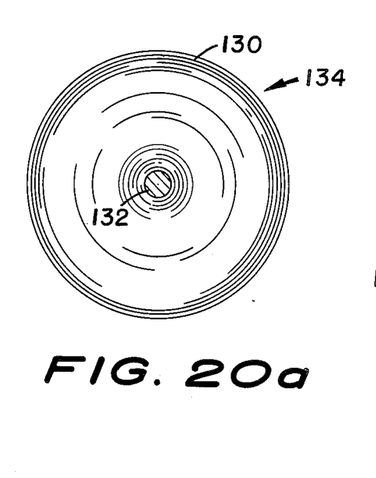
FIGS. 20a and 20b are schematics illustrating one method of winding a rim member.
Figure 20B:
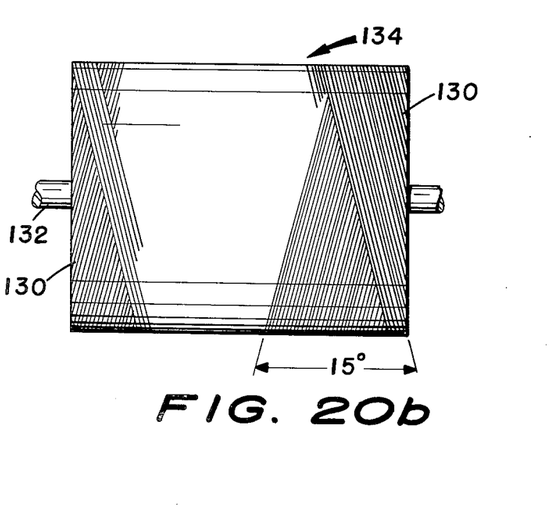

In such a shaft wound configuration, it will usually be convenient to make use of the overlapping level-wind technique used extensively in the filament production industry. Referring to FIG. 20a, filamentary material 130 is wound at a slight angle to the plane normal to shaft 132, and this angle is reversed each time the end of the thus formed rim member 134 is reached. The included angle between the windings of one layer and the windings of an adjacent layer can be any value established as being necessary to form a stable structure without the requirement for special support structure at its ends. If this angle were 15°, which is often used in the industry, and which is illustrated in FIG. 20b, then the loss in apparent strength of the filamentary material 130 is less than 1% (i.e., one minus the cosine of $7.5° = 0.99145$). This is the simplest of the multi-ring flywheel structures, and applies particularly to bare filament materials of low cost. Materials examples of this type include paper, string, wire, Nylon, low grade fiberglass, bamboo, wood, etc. Although not shown for simplicity in FIGS. 20a and 20b, the rim member 134 is to be held, as has been previously described, by bands, such as the bands 14 of FIGS. 1a and 1b, or by a matrix material in cooperation with such bands or in substitution therefor. As with the other embodiments of the invention, relative motion of windings of the filamentary material 130 is to be restrained along one or more diameters of the structure.

Similarly, discrete concentric rings may also be used without matrix to form the rotors, to also accommodate ring stretch during rotation. Of particular note, the present structures can be fabricated with ballast material between the rings or wound portions thereof. However, ballast is not required for successful operation, its use merely reducing cost and rotor volume. Ballast, as shown at 140 in FIG. 21, can be used in any desired fraction from zero to 100% of a designed maximum being that situation where all rings or elements are spinning at the same tensile stress level and the amount of ballast varies inversely with the square of the radius of the rotor ring.

Figure 21:
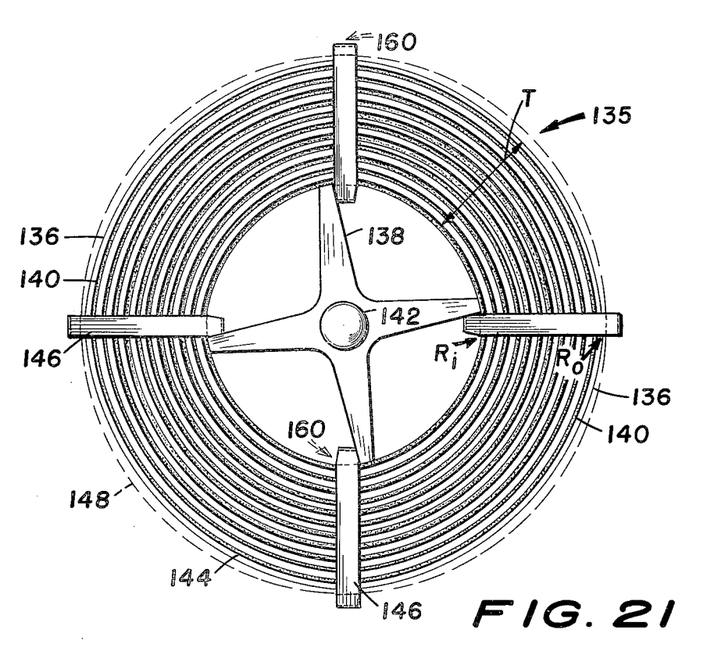
FIG. 21 is a top planar view of a further embodiment of the invention wherein ballast is employed within the structure and the outer perimetric surface is advantageously shaped.

In FIG. 21, the rotor 135 is seen to be formed of discrete concentric rings 136, the spacing between rings being exaggerated so that the ballast material 140 can be conveniently seen on the interior portion of each ring 136. The rotor 135 could as well be formed of wound filaments with ballast disposed of the interior surface of the windings. The structure of hub spokes 138 and the particular shape of the rotor 135 are additional important features which will be discussed in detail hereinafter so that a full discussion of the advantages of the ballast material 140 can now be given.

As was previously pointed out, the stress in the individual rings or windings is a function of the square of the particular rim member radius. It then follows that all of the rings or windings except the outermost one are operating below their maximum stress capability; which also means that they are operating below their maximum energy storage capability. The rim at $R_i = \frac{1}{3} R_o$, for example, is only at one-ninth of its capability, since the rpm and density are the same for all rings or windings. And, remembering that the energy is also a function of the mass, in addition to the square of the radius, the mass could be increased by a factor of nine before the stress on the fibers would approach their maximum design value. Ideally, if the ballast material 140 had infinite density (zero volume) were used, all that would be required to bring the configuration to that situation where all of the rings or windings would be operating at maximum design stress and energy, would be to add ballast to each rim or winding in proportion to $(R_o/R_x)^2$, where $R_x$ is the radius of the one being ballasted. In any event, depending upon the particular materials employed, it suffices to say that the amount of ballast needed would decrease as the radius of the particular ring or winding increased. Examples of typical ballast materials include solid lead, uranium, or steel dust in a lead or other relatively flexible matrix.

On the other hand, the penalty for adding the ballast to obtain an energy per unit volume advantage is a slightly reduced energy per unit weight. The degradation would ideally be zero, if the ballast did not take up any space, since the total energy will be proportional to the weight, when the other governing factors (radius and rpm) do not change. On this basis, the highest energy per unit volume is obtained when the ratio of ballast weight to flywheel material weight is the greatest. Such would be the case for a multi-ring flywheel made of wood and ballasted with uranium dust in a lead matrix. The ballast density in this case would be thirty times that of the wood. For many flywheel applications studied to date, the slight degradation in energy/weight performance would be of no consequence, compared to the large gain in energy/volume performance. More important than the increase achieved in energy per unit volume, for most applications, is the fact that the ballasted multiring flywheel can be many times less expensive than the nonballasted one, due to the relatively inexpensive nature of typical ballast materials when compared to the typical filamentary materials.

Although the ballast 140 should have a thickness varying inversely as the square of the radius, a practical situation as shown would decrease the amount of ballast with increasing radius.

Turning attention now to the rotor 135 of FIG. 21, it is seen that the outer perimeter 144 of the rotor (seen at rest) is not perfectly circular below the four points on said perimeter held by containment bands 146. However, on rotation of the rotor 135 about axis of rotation 142, the perimetric edge portions of the rotor between the bands 146 "expand" to the position shown in phantom at 148. Thus, the rotor 135 is pre-shaped to assume a rotating conformation which minimizes ring-imposed stresses on the hub spokes 138. This stress minimization is accomplished by causing the rings 136 at the rated rotation rate of the rotor 135 to make an angle of less than 90° to the attachment point of the bands 146 (or actually to the longitudinal axis of each band 146). The rings 136 at rest are thus formed in a non-circular or "sub-circular", conformation. The arc length of the rings 136 between the bands 146 are less than a circle segment would be between the bands 146.

The amount of "sub-circularity" required to determine the shape of the rings 136 is a direct function of the strain of the ring material at the operating speed of the rotor. If the material under consideration has a characteristic of stretching 4.6% at operating speed, then the circumference of the rotor 135 at rest must be 4.6% less than a perfect circle of the same radius would be.

Figure 22:
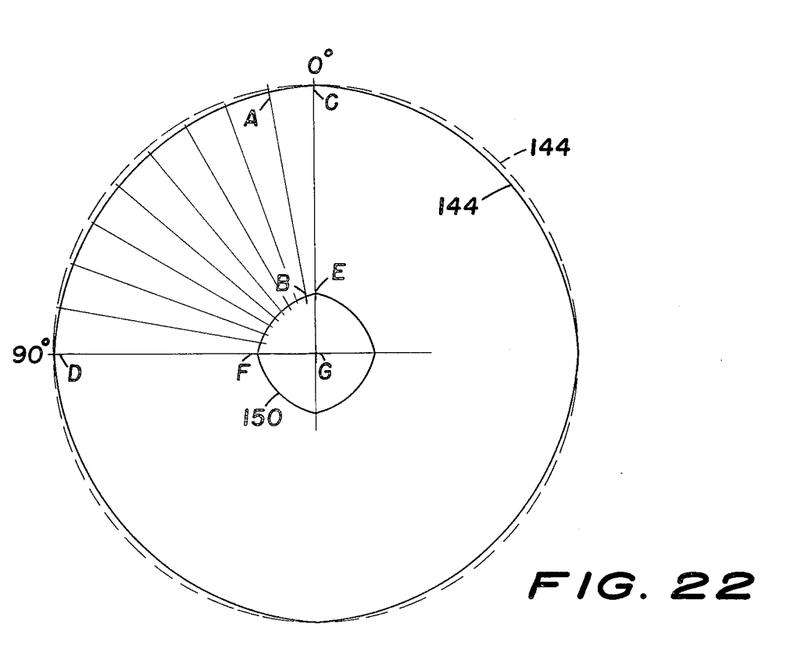
FIG. 22 is a schematic illustrating a manner of forming the rotor of FIG. 21.

To wind a rotor from filamentary material or to conform a rotor of discrete rings in the shape shown in FIG. 21, a specially shaped mandrille which produces the desired final size, shape, and rotor thickness needs to be employed. The definition of the shape of such a mandrille follows and is referenced to FIG. 22. The sub-circular perimetric ring shape is seen at 144 (identical to the perimeter 144 of FIG. 21) and has a total circumference which is 4.6% less than the circle 148 circumscribing said perimeter 144. The circle 148 is constructed from the radius DG, and is, of course, equal to CG. The sub-circular arc, DAC, is then divided into an appropriate number of segments (nine as shown). The rotor itself would extend from a desired nominal hub radius, EG, for a total radial thickness of EC (=FD). Thus, it is only necessary to lay out this radial thickness inward of the respective construction segments to define the hub arc shapes, FBE. (CE=AB, etc.). The arc FBE, together with its three identical arcs in the other quadrants, defines a complete mandrille surface 150 upon which a subcircular rotor such as the rotor 135 can be wound. Mandrille sizes producing shapes of greater radially inwardly increasing thickness, yet retaining the shape of perimeter 144, can be similarly laid out as described. When the mandrille radius is about 1/10 of the rotor outside radius, the shape of the mandrille surface is essentially a square for the four band situation. Thus, a hub for a rotor so configured could have its outer surface, i.e., the surface about which the windings or rings are to be disposed, formed into the desired mandrille shape as described. Configurations wherein the rotor is held by two, three, or more containment bands 146 are formed similarly and need not be described here.

Referring again to FIG. 21, the inside radius of the rotor 135 is shown to be 58% of its outside radius in order to optimize E/V vs. E/W. The rotor radial thickness is seen to be constant when the rotor is at rest. When the rotor is at rated speed, only the outmost ring 136 (or winding) becomes circular, since the amount of ring stretch is proportional to the square of the ring radius. Thus, the summation of the radial force vectors of all the spinning rings 136 is always slightly negative, i.e., its direction is toward the axis of rotation 142. Hub/spoke attachment is thereby simplified. Balance weights 160 on both the outer periphery and inner periphery of the rotor 135 are also to be seen in FIG. 21. While these weights 160 are not necessary to operation of the rotor, their presence aids in balancing the structure and cause no unusual stress problems since loads at these locations are relatively small. The weights 160 may be attached to the bands 146 on either the inside or outside peripheries, or, as shown, on both.

Figure 23:
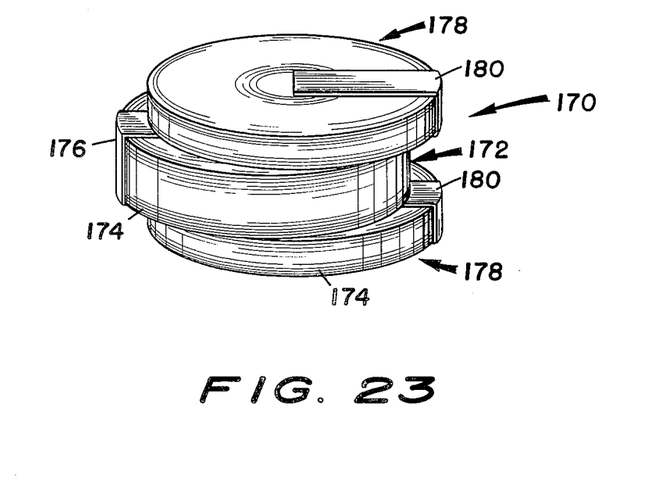
FIG. 23 is a schematic illustrating a "one-spoke" embodiment of the invention; and, FIG. 24 is a schematic illustrating a further "one-spoke" embodiment of the invention.

Referring now to FIG. 23, a rotor 170 having only restraining structure extending over only one-half of the rotor is shown. The rotor 170 is formed of one major portion 172 which could be comprised of a plurality of stacks of rings or windings 174 and held by a single constraining band 176 equal in length to one radius or portion of a radius equal to the thickness of the rotor 170. The portion 172 is sandwiched between minor portions 178, the latter two of which are identical in size and weight and are slightly offset from the major portion 172. The portions 178 have single restraining bands 180 which are similar to the band 176 in structure but which extend in the opposite direction therefrom. The portion 172 is twice the thickness of the portions 178, the portions 178 being employed to balance against the rotor expansion 170 when one single restraining band 176 is used to confine the structure. The reasons for having the rotor in three sections with the outer two end pieces each having half the mass of the center piece are now explained. First, in the single spoke configuration shown, all of the points on the unsupported portion of the rings will expand outward from the initial center of rotation, the points under the single spoke being thereby constrained. This means that a single rotor made like this will become more and more unbalanced as the rotational speed is increased. Now, if a second rotor, just like the first, is aligned on the same shaft, but with its single spoke opposite the original one, the rotor is said to be in static balance at all operating conditions. That is the radial force on one set of expanding rings is equal and opposite to the force on the other set.

Figure 24:
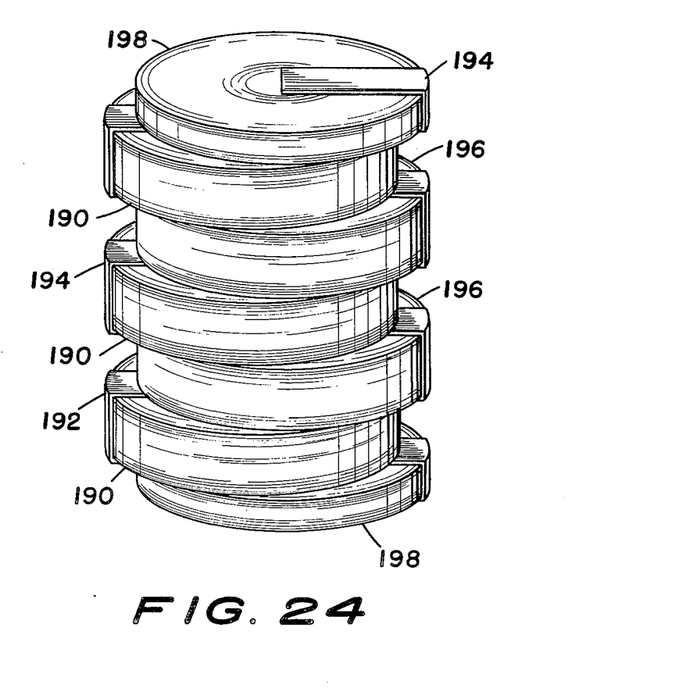

However, in the example given, these equal and opposite force vectors are displaced axially by a distance of one rotor axial thickness (assuming density homogeneity). This, of course, creates a condition of dynamic imbalance, or a case where the spin axis would, if unconstrained, tend to nutate. This imbalance is avoided by taking either one of these rotor halves and dividing it in half again, placing each half on either side of the original section. Now the summation of all three vectors are not only zero (static balance), but they are in the same plane (dynamic balance) (FIG. 23). And, if the ring material is identical everywhere, this static and dynamic balance will be achieved, regardless of the minor shape variations in the respective rings, owing to their different radii. It is also true that the same theory applies to a rotor made of many slices having a longer axial length than the three section rotor shown in FIG. 23, provided that the two end sections are half the mass of each of the center sections, and that their single spokes are parallel and in the same direction, and that this direction is opposite to the direction of the two axially adjacent rotors in an odd numbered stack. The simplicity of this rather complex statement is illustrated in FIG. 24. It will be noted that the odd numbered stacks 190 all have single spokes 192 in the same direction, and that the single spokes 194 in the even numbered sections 196 are in line with each other, but opposite direction from the single spokes 192 in the odd numbered sections. It will also be noted that, before the thin end sections 198 are added there are an odd number of total sections. The addition of the equal, thin, end sections provide the force vector summation which results in theoretical static, as well as dynamic balance. FIGS. 23 and 24 show the adjacent sections to be radially shifted in the direction of the respective spokes, although this is not a requirement for successful operation. This displacement simply clarifies the explanation, but also illustrates how this predisplacement can be selected to result in the outer ring being not only circular, but having its centers at the rotor axis at rated RPM. At this condition, of course, the bend angle of the ring during operation (angle $\theta$, FIG. 2) is zero. Now, if the outer ring is circular, it follows that the inner rings are not circular, and not centered on the spin axis. Either of these conditions will result in the imposition of additional stresses at the point of attachment to the single spoke. However, the magnitude of these additional stresses is believed to be relatively small compared with those in comparable multi-spoke configurations. Because of inplane asymmetries, the single spoke multi-ring rotor is very difficult to with respect to local stresses, compared to the other multi-ring types, however.

The reason this seemingly complex rotor geometry is considered useful is that it may have certain cost advantages over other types. Other things being equal, a single spoke or tie band should be less expensive to build than any multi-spoke or multiband configuration. More importantly, however, the presence of one spoke or tie band, instead of multiple ones, will always result in lower flexure angles for a given material.

What is claimed is:

1. An inertial energy storage rotor device for rotation about a shaft comprising, in combination,
   rim means comprised of a plurality of annular rim elements formed of essentially anisotropic material having substantial tensile strength along longitudinal axes thereof;
   rim constraining means for restraining radially outward movement, relative to the shaft, of the rim elements, the rim constraining means being disposed at selected locations of the rim means; and
   hub means for carrying the rim means, the hub means being attached to the shaft.

2. The inertial energy storage rotor device specified in claim 1 wherein said rim elements are formed of fiber composite material.

3. The inertial energy storage rotor device specified in claim 2 wherein said rim elements comprise filament windings.

4. The inertial energy storage rotor device specified in claim 2 wherein said rim elements are discrete rings.

5. The inertial energy storage rotor device specified in claim 1 wherein rim elements have ballast material disposed therebetween.

6. The inertial energy storage rotor device specified in claim 1 wherein said rim constraining means extends along a single diameter of the rotor device and its opposite ends hold said rim means only at two attachment points.

7. The inertial energy storage rotor device specified in claim 6 wherein the rim constraining means is a composite filament material wound diametrically about said rim means.

8. The inertial energy storage rotor device specified in claim 6 wherein said rim elements are fastened together at each attachment point.

9. The inertial energy storage rotor device specified in claim 6 wherein said rim constraining means is expandable along said diameter.

10. The inertial energy storage rotor device specified in claim 9 wherein said rim constraining means is a pair of flexible hoop members whose diametrically opposed edges connect each of two diametrically opposed sides of the shaft to said rim means at one of said attachment points.

11. The inertial energy storage rotor device specified in claim 9 wherein said rim constraining means is a single flexible hoop disposed in a plane perpendicular to the plane of rotation of said rim means and having diametrically opposed edge portions connected to said rim means at said attachment points.

12. The inertial energy storage rotor device specified in claim 11 wherein the shaft extends through the body of the hoop along a line perpendicular to a line connecting said attachment points.

13. The inertial energy storage rotor device specified in claim 6 wherein,
   said rim elements are formed of composite fibers fastened together only at said two diametrical attachment points, and
   said rim constraining means comprises a flexible hoop means having its outer edge attached to said rim elements at said two attachment points.

14. The inertial energy storage rotor device specified in claim 1 wherein the rim means are formed with outer perimetrical arc-like surface portions circumscribed when at rest by a circle of a radius which equals the perimeter defined by the combination of surface portions when the device is rotated at a pre-determined speed.

15. The inertial energy storage rotor device specified in claim 1 and further comprising balance weights disposed on perimetric surfaces of the rim means.

16. The inertial energy storage rotor device of claim 1 wherein the rim means comprise a major interior portion held along one radius thereof by rim constraining means, two minor portions of the rim means holding said major portion therebetween, the two minor portions being held along radii thereof by rim constraining means which extend in the opposite direction from said first-mentioned rim constraining means.

17. The inertial energy storage rotor device specified in claim 5 wherein rim elements disposed relatively more near to the shaft have greater amounts of ballast material disposed therebetween than do those rim elements located within the structure at a relatively greater radial distance from the shaft.

18. The inertial energy storage rotor device specified in claim 1 wherein the rim elements comprise filament windings, windings beginning at the inner periphery of the rim means and extending to the outer periphery thereof being wound back inwardly toward the shaft to a point of termination.

19. The inertial energy storage rotor device specified in claim 18 wherein the point of termination lies on the inner periphery of the rim means.

20. The inertial energy storage rotor device specified in claim 1 wherein certain of the rim elements are disposed within the rim means at an angle to a plane normal to the shaft.

21. The inertial energy storage rotor device specified in claim 20 wherein certain other rim elements are disposed at an equal angle to a plane normal to the shaft as said first-mentioned rim elements,
   lines along which the second-mentioned rim elements extend having the negative slope of the lines along which the first-mention rim elements extend.

22. The inertial energy storage rotor specified in claim 21 wherein the first and second-mentioned rim elements lie alternately in successive layers extending radially from the shaft.

23. An inertial energy storage rotor device for rotation about a shaft comprising, in combination,
rim means carried on the shaft and comprised of a plurality of annular rim elements formed of essentially anisotropic material having substantial tensile strength along longitudinal axes thereof; and,
rim constraining means for restraining radially outward movement, relative to the shaft, of the rim elements, the rim constraining means being disposed at selected locations of the rim means.

24. The inertial energy storage rotor device specified in claim 23 wherein said rim constraining means extends along a single diameter of the rotor device and its opposite ends hold said rim means only at two attachment points.

25. The inertial energy storage rotor device specified in claim 24 wherein the rim constraining means is a composite filament material wound diametrically about said rim means.

26. The inertial energy storage rotor device specified in claim 24 wherein said rim elements are fastened together at each attachment point.

* * * * *